US007565626B2

(12) United States Patent  
Krusche et al.

(10) Patent No.: US 7,565,626 B2
(45) Date of Patent: Jul. 21, 2009

(54) METHOD FOR CONTROLLING NETWORK DEVICES VIA A MMI

(75) Inventors: Arnd Krusche, Fellbach (DE); Stuart Allen, Stuttgart (DE)

(73) Assignee: Sony Deutschalnd GmbH, Cologne (DE)

( * ) Notice: Subject to any disclaimer, the term of this patent is extended or adjusted under 35 U.S.C. 154(b) by 187 days.

(21) Appl. No.: 09/901,275

(22) Filed: Jul. 9, 2001

(65) Prior Publication Data

US 2002/0003548 A1 Jan. 10, 2002

(30) Foreign Application Priority Data

Jul. 10, 2000 (DE) .................. 00114792

(51) Int. Cl.
G06F 3/048 (2006.01)
G06F 15/177 (2006.01)
G06F 15/173 (2006.01)

(52) U.S. Cl. .................. 715/853; 715/855; 715/734; 715/769; 709/224

(58) Field of Classification Search .................. 345/734, 345/736, 737, 744, 853; 709/217, 218, 220, 709/223, 224; 715/853, 855, 734, 769
See application file for complete search history.

(56) References Cited

U.S. PATENT DOCUMENTS

| 5,202,961 | A | | 4/1993 | Mills et al. |
| 5,751,965 | A | * | 5/1998 | Mayo et al. .................. 709/224 |
| 5,796,951 | A | | 8/1998 | Hamner et al. |
| 5,958,012 | A | * | 9/1999 | Battat et al. .................. 709/224 |
| 6,028,602 | A | | 2/2000 | Weidenfeller et al. |
| 6,032,202 | A | * | 2/2000 | Lea et al. ...................... 710/8 |
| 6,281,896 | B1 | * | 8/2001 | Alimpich et al. ............ 715/781 |
| 6,523,696 | B1 | * | 2/2003 | Saito et al. .................. 709/223 |
| 6,615,088 | B1 | * | 9/2003 | Myer et al. .................... 700/20 |
| 6,628,304 | B2 | * | 9/2003 | Mitchell et al. ............. 345/734 |
| 7,257,821 | B2 | * | 8/2007 | Wendorf et al. ............. 719/328 |

FOREIGN PATENT DOCUMENTS

EP 0 690 367 1/1996

OTHER PUBLICATIONS

Microsoft Windows, Version 4.0, copyright 1998.*

* cited by examiner

*Primary Examiner*—Ting Zhou
(74) *Attorney, Agent, or Firm*—Oblon, Spivak, McClelland, Maier & Neustadt, P.C.

(57) ABSTRACT

A method for controlling network devices via a man-machine interface including determining a connection of one or more devices to a network, determining availability of one or more multimedia services available via a respective one of the connected devices, and displaying a hierarchical view representative of one or more of the connected devices and one or more of the available multimedia services.

15 Claims, 9 Drawing Sheets

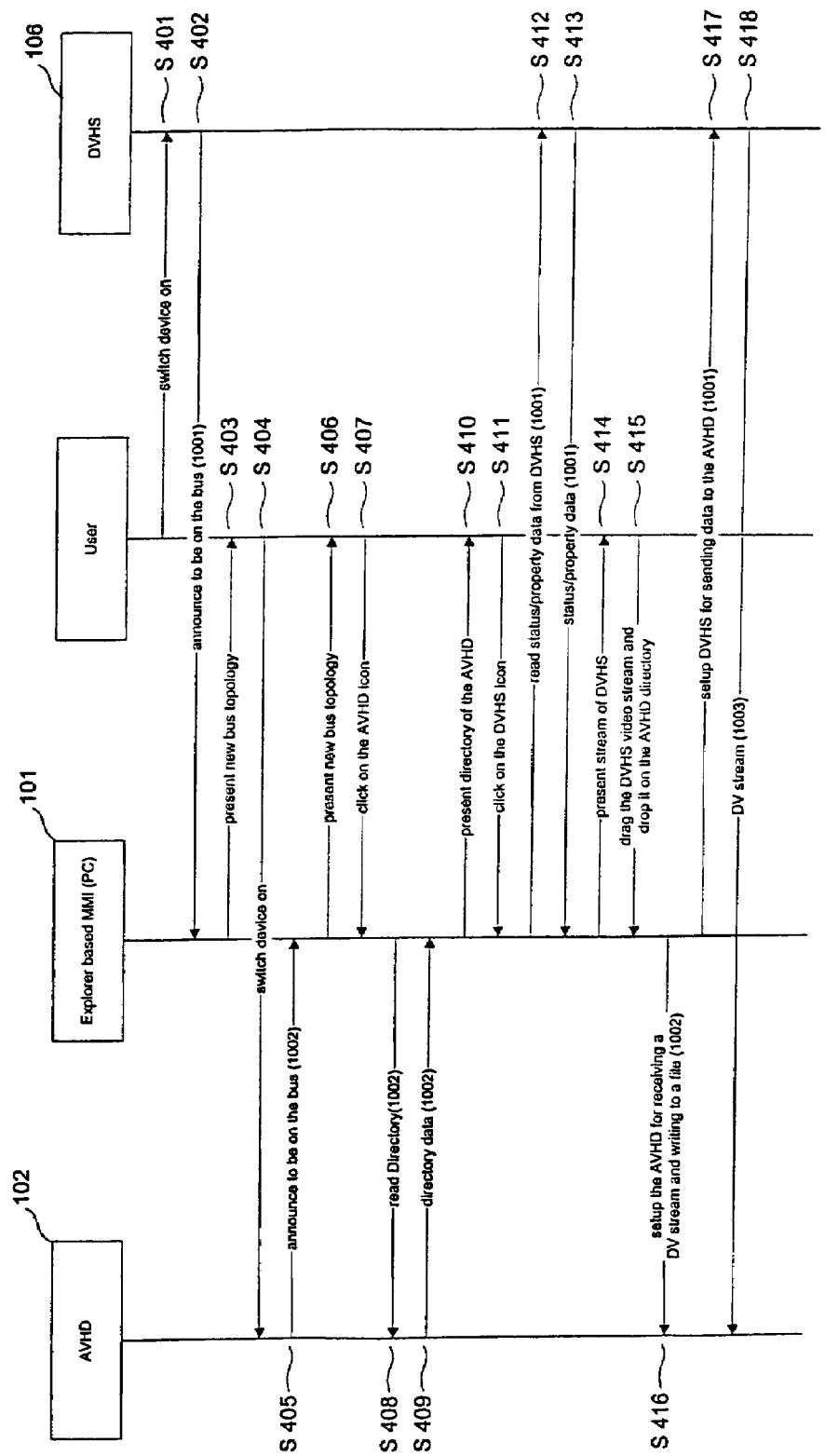

METHOD FOR CONTROLLING NETWORK DEVICES VIA A MMI

BACKGROUND OF THE INVENTION

1. Technical Field

The present invention generally relates to a method for controlling network devices via a MMI by which an easy and fast control of various kinds of devices is provided for a user. In addition, the present invention relates to a MMI for controlling said network devices, and to a computer program adapted to execute said method.

2. Description of Related Art

Generally, a network, such as a home network, comprises several devices. Such a device may be a controller to control other devices, or a target device, i.e. a controllable device which is controlled by a controller. As for example, a home network may comprise all various kinds of devices such as PC-, AV-, Telematics- and Communication-devices which are typically present in a home, e. g. in different places like first floor, second floor, distinct rooms etc. Due to the large variety of different devices it is an important aspect for said network that efficient data lines are provided by which large quantities of data and/or different kinds of data may be exchanged. Nowadays, an appropriate data transmission between the devices connected to such a network is advantageously realized on the basis of the IEEE 1394 standard which is a powerful technology that meets many of the requirements of home networks.

Since their widely-spread distribution due to falling prices and enhanced chip capabilities Personal Computers have become an integral part of the home network philosophy. Usually, Personal Computers are used in home networks as controllers in order to provide an easy control of other devices, e. g. by means of a common user interface.

FIG. 6 shows an example for a possible network configuration according to the prior art wherein a home network representing a typical structure of a home is constituted of a plurality of devices arranged in sub-networks. Said home network comprises e.g. a first sub-network 1 named "Home Floor 1" which is located on the first floor of the home, a second sub-network 2 named "Home Floor 2" which is located on the second floor of the home, a third sub-network 3 named "IP Network", a fourth sub-network 4 named "Car" which is located within a car, a fifth sub-network 5 named "Friend" which is located in the home of a friend, and a sixth sub-network 6 named "any other network" which is located anywhere else outside the home.

As shown in FIG. 6, the first sub-network 1 comprises various electronic devices such as a PC 101, an Audio/Video Hard Disc (AVHD) 102, a TV 103, a Camcorder 104, a Memory Stick Walkman 105 and a Data Video Home System (DVHS) 106. Data transmission within the first sub-network 1 is based on the IEEE 1394 standard. For example, the PC 101 may be used as controller within the first sub-network 1, e. g. to record files from the AVHD 102 to the Memory Stick Walkman 105.

The second sub-network 2 comprises an Amplifier 107, a Digital Audio Broadcasting (DAB)-Tuner 108, a Camcorder 109, a Projector 110 and a Home Appliances Control System 132. In this second sub-network 2, the data transmission is also based on the IEEE 1394 standard. The Home Appliances Control System 132 behaves as a controller for numerous devices. For example, the devices 107-110 connected to the second sub-network 2 may be controlled by the Home Appliances Control System 132.

Further, the second sub-network 2 is connected to the first sub-network 1 via a second bridge 129 which enables a data exchange between the first sub-network 1 and the second sub-network 2. In the illustration of FIG. 6, the second bridge 129 is connected to the first sub-network 1 and the second sub-network 2 and is not included within one of said first or second sub-networks 1 or 2. This signifies that the second bridge 129 does not perform a protocol conversion during a data exchange, because both first and second sub-networks 1 and 2 are based on the same standard, namely IEEE 1394. In case of a data transmission via the second bridge 129 it is possible to control the devices 107-110 connected to the second sub-network 2 not only via the Home Appliances Control System 132, but also via the PC 101 connected to the first sub-network 1. It is further possible to control the devices 101-106 connected to the first sub-network 1 via the Home Appliances Control System 132.

With reference to the first sub-network 1 and the second sub-network 2, the devices connected thereto may preferably use the Audio Video Command (AV/C)-protocol in accordance with their generic type. Alternatively, said devices may also use another appropriate protocol standard.

The third sub-network 3 shown in FIG. 6 comprises electronic devices such as a Portable Phone 111, a Personal Digital Assistant (PDA) 112 and a Laptop 113. For example, the PDA 112 may be a handheld computer. Said devices 111-113, contrary to the devices connected to the first and second sub-networks 1 and 2, may not use the AV/C-protocol, but rather the internet protocol.

The fourth sub-network 4 comprises electronic devices such as an Amplifier 114, a Navigation Unit 115, a Tuner 116, a CD-Changer 117, a MD-Changer 118, a Display 119 and a Portable Phone 120. Further, the fifth sub-network 5 comprises electronic devices such as a Camcorder 121, an Audio/Video Hard Disc (AVHD) 122, a Still Picture Camera 123, a TV 124, a Set-Top-Box 125 and a DVHS 126. Both the fourth sub-network 4 and the fifth sub-network 5 are based on the IEEE 1394 standard.

The third sub-network 3 is connected to the first sub-networks 1, the fourth sub-network 4 and the fifth sub-network 5 via a first bridge 128, a third bridge 130 which is a remote bridge, and a fourth bridge 131, respectively. Thus, data transmission is possible between the respective sub-networks. Due to different protocol standards of the first sub-network 1, the fourth sub-network 4 and and the fifth sub-network 5 on the one hand, and the third sub-network 3 on the other hand, a protocol conversion has to be executed in case of a data exchange between the third sub-network 3 and one of the first, fourth or fifth sub-networks 1, 4 or 5. With respect thereto, unlike the second bridge 129, said first, third and fourth bridges 128, 130 and 131 are included within the corresponding sub-networks so that no further connection thereto is necessary, respectively. This signifies that said first, third and fourth bridges 128, 130 and 131 handle said protocol conversion, wherein AV/C frames are transmitted inside IP frames, and vice versa.

If data is transmitted from the first sub-network 1 to the fifth sub-network 5 via the third sub-network 3, the latter is used as a transparent transport medium. This allows the first and fifth sub-networks 1 and 5, which are based on the IEEE 1394 standard, to be connected via a non IEEE 1394 sub-network as if they were connected like two IEEE 1394 sub-networks, e. g. the first sub-network 1 and the second sub-network 2. Through the provision of said first to fourth bridges 128-131 the electronic devices connected to the fourth or fifth sub-networks 4 or 5 are accessible from the first or second sub-networks 1 or 2, for example.

In addition, it is obvious that said home network may be extended by any other discrete sixth sub-network 6 comprising any other device 127. Furthermore, any number of devices connected to a sub-network are controllable by a control system which is connected to the home network via the same sub-network or a distinct sub-network.

Document WO 95/59282 A2 discloses a method and a system for controlling diverse home devices which are all connected to a network, e. g. a home network. The teaching of said document explicitly excludes Personal Computers being a part of said network. Control and command information is sent from a control device to a target device in order to control the target device according to an user input. Since the control device can display an user interface transmitted thereto from any target device connected to the network, a single control device may control a plurality of different target devices without requiring any change in the mode of operation of the control device.

According to the teaching of said document, communication on the home network is basically provided through the use of the TCP/IP-standard network protocols. Each target device connected to said network is discovered. Subsequently, a device link page is loaded which contains home device buttons for each home device connected to the home network.

Therefore, if the user wants to get access to services of a specific home device, a session manager generates an interface displaying a loaded top level home page of the respective home device with reference to said home device buttons.

Further, it is to be noted that each top-level home page for a respective home device has a different structure according to different operating functions associated therewith. Hence, the user has to concentrate on different structures of distinct top-level home pages, respectively.

Therefore, it is the object of the present invention to provide a method for controlling various kinds of devices connected to a network via a Man Machine Interface (MMI), by which an easy control is possible for the user.

This object is achieved by a method for controlling network devices via a MMI according to claim 1. Preferred embodiments are defined in dependent claims 2 or 9.

BRIEF SUMMARY OF THE INVENTION

The method according to the invention comprises the following steps: generating and at least partially displaying a hierarchical view of icons of all devices connected to the network and/or services corresponding to the devices, and coupling each of said icons with operating functions of the associated device and/or service, respectively, wherein said devices and/or services are operatable from said hierarchical view.

The method according to the invention is based on a tree-based control, wherein said network, preferably a home network, its devices and their services are preferably treated as an extension of an existing Personal Computer hierarchical file system which has been formerly known only for file management on a PC. According to the invention it is possible to control all devices and/or services corresponding to the devices in the same way, irrespective of their type and their local connection to said home network. Since the structure of said known hierarchical file system is similar to the view of icons generated according to the invention, the user can directly control all devices and/or services corresponding thereto, which are included within said home network, from one common MMI in a familiar and comprehensive manner. This approach provides a very easy and fast control for the user, because the operation mode thereof is self-explaining.

The method according to the invention supports not only non-computer devices like audio/video or communication devices and their services, but also computer storage devices (organized e.g. by folders and files). By means of this approach, it is possible to make use of all the functionality currently available from known browser systems. In this context, browser is used as a generic name, wherein the meaning thereof is not limited only to a HTML browser such as Microsoft Explorer® or Netscape Navigator®. Nevertheless, it is to be understood that the present invention is not exclusively browser-based, but rather related to a tree-like hierarchical structure in general.

Preferably, a sub-network being integrated in said home network is recognized via a bridge and integrated as an icon in said hierarchical view of icons similar to said devices and/or services, wherein said icon assigned to said sub-network has a higher order than icons assigned to devices and/or services of said sub-network. Hence, other networks that are connected to the local home network are included in this hierarchy. These sub-networks are made a logical part of the home network through the use of the aforementioned bridge devices, and thus a part of the hierarchy. The other sub-networks may be based upon the same or different protocols, and the same or different physical layer.

Further preferably, a device and/or service is operatable by drag and drop operations, e. g. for copying audio streams to a storage device like a memory stick. Alternatively, a device and/or service may also be operatable by cut/copy and paste operations. As for consequence, the user is enabled to execute any control of a device and/or service directly from said view of icons, which leads to a very easy and fast operation mode. The user is not required to take any preparatory steps before executing said control operations.

Still, further preferably, a device and/or service is operatable via context sensitive menus shown in said hierarchical view after selecting the icon associated with said device and/or service. As for example, the user can operate the device and/or the service corresponding thereto by using the right mouse button menu. In the same way as "right clicking" on a hard disk which allows to format and share the disk, the user may "right-click" on a DAB-receiver connected to the home network which would allow him to tune it up, find its properties, share it with other network users etc., even to users who may be outside the "own" network. For a more comprehensive control, specific applications may be associated to resources. These applications would launch when the appropriate action is taken, or situation arises. For example, an AV editing suite could be associated with audio and video files, and a DAB control panel for a DAB receiver.

Still further preferably, after operation at least one control signal and/or at least one data stream is sent from one device to at least one other device. By using of this kind of MMI-viewer/manager, the user does not need to be aware of the physical storage or transmission media, since only the access and processing of a respective object is of importance for the user.

Still further preferably, said hierarchical view of icons is organized according to predetermined user-selectable rules. In this way, it is possible for the user to organize said hierarchical view of icons according to respective control operations. Further, the user can advantageously adapt said hierarchical view of icons to frequent control steps being typical of his habits.

Still further preferably, or alternatively, said hierarchical view of icons is organized depending on the kind of said devices and/or sub-networks connected to the home network.

In this case, said hierarchical view of icons may comprise a properties dialog accessible through a context sensitive menu as explained above. Said properties dialog would be a small information dialog that may include basic controls such that the user is allowed to control certain parameters of a respective device. As for example, if a heating system is included within the home network, the properties dialog may include a basic control such as a timer combined with heating controls. Correspondingly, the information displayed within said small information dialog could be current ambient/water temperature. In another example the properties dialog could include information such as station frequency, station name and signal quality for a tuner unit included within the home network. In the example of a video recorder included within the home network the properties dialog could include information such as tape length, remaining play time or the like.

Still further preferably, or alternatively, said hierarchical view of icons is organized depending on the kind of services being available in correspondence with said devices. By means of this object-oriented view, all multimedia object types (audio-, video-, data-files, streams, services etc.) being available on the home network and all possible processing services (copying, storing, mixing, filtering, rendering, sending) corresponding to the devices can be identified and displayed, wherein said processing services can be accessed via said display.

As for example, the user is allowed to simply select a live audio stream on a DAB receiver and drag it to a memory stick walkman, both included within the home network. This would record the audio stream onto the walkman in a very simple way. As another example, an output of a security camera could be received by simply finding it within said hierarchical view of icons. A stream associated thereto could be displayed in real-time on-screen. This approach could be extended to a very effective video conferencing system or a nursery monitoring.

Still further preferably, the AV/C protocol is used for controlling the devices and/or services. Nevertheless, it is to be understood that within the home network, any other appropriate kind of protocol, such as the TCP-, IP- or FCP-protocol, may be used in order to support a device different from audio/video, such as printers, copy machines or the like.

Further, it is an object underlying the present invention to provide an interface device by which an easy and comprehensive control for the user is rendered possible.

This object is solved by a MMI for controlling network devices according to claim 10, wherein said MMI is based on a known hierarchical file navigation concept and adapted to perform the method as defined in any one of claims 1 to 9.

A further object underlying the present invention is to provide a computer program product by which an easy and comprehensive control for the user is rendered possible.

This object is achieved by a computer program product according to claim 11, wherein said computer program product comprises a computer program means which is based on a known hierarchical file navigation concept and adapted to execute all steps defined in any one of claims 1 to 9, when said computer program product is executed on a computer.

Further objects, features and advantages of the present invention will be better understood from the following detailed description of advantageous embodiments thereof taken in conjunction with the accompanying drawings, wherein:

BRIEF DESCRIPTION OF THE DRAWINGS

FIGS. 4a, 4b illustrate another example of a network communication according to the present invention wherein a DV stream from a DVHS is copied to an AVHD via a control by a PC;

DETAILED DESCRIPTION OF THE INVENTION

Figure 1:
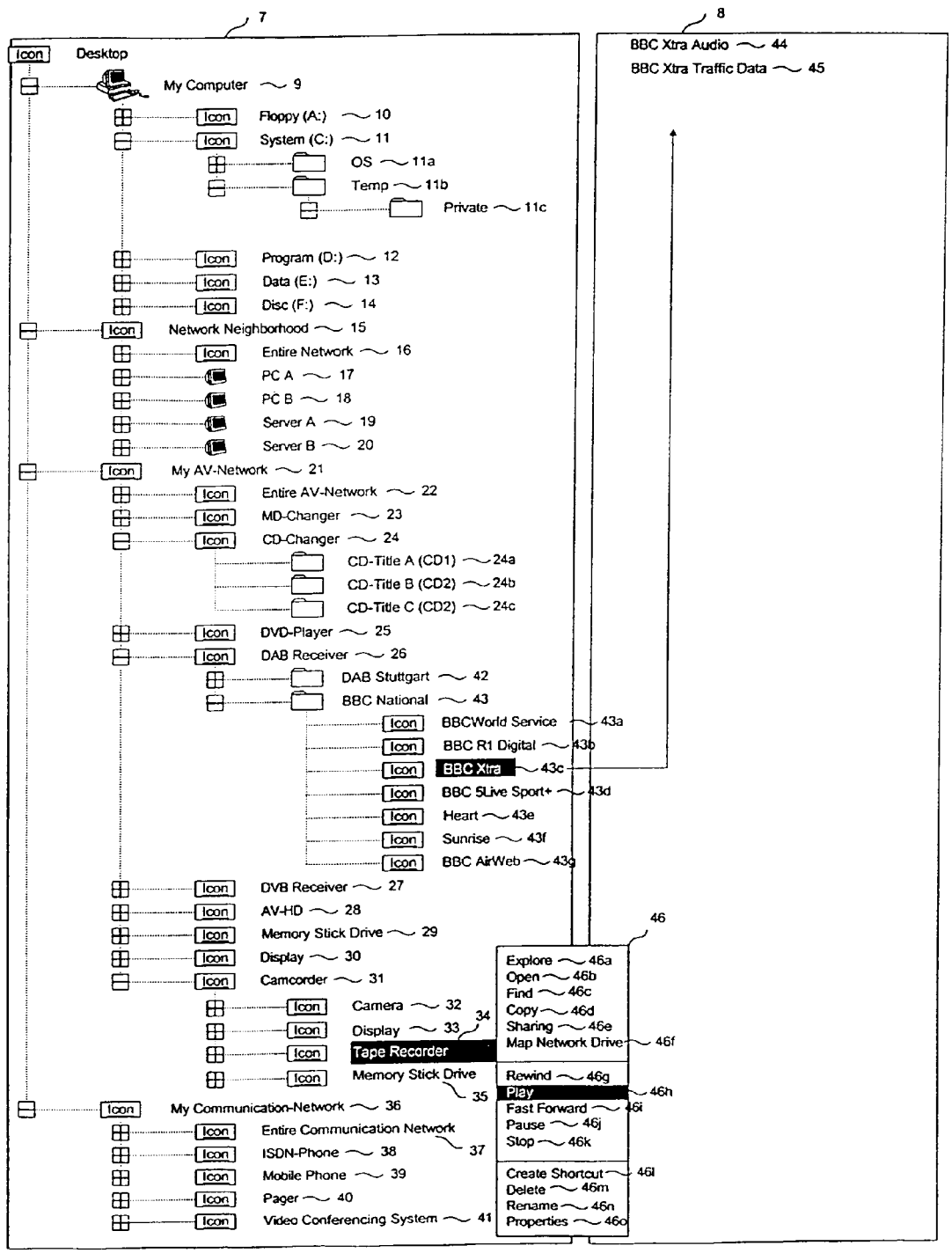
FIG. 1 illustrates an example of a browser based MMI according to the present invention wherein a hierarchical view of icons generated according to the present invention is organized depending on the kind of devices and/or sub-networks included within a home network.

FIG. 1 illustrates an example of a browser-based MMI according to the present invention wherein a hierarchical view of icons generated according to the present invention is organized depending on the kind of devices and/or sub-networks included within a network, preferably a home network. FIG. 1 shows a main window 7 of the MMI positioned on the left side, in which icons assigned to sub-networks, devices and services available on the home network are displayed. Said hierarchical view according to the present invention is similar to a view e. g. shown in a browser window of the Microsoft Explorer®, but it is of course not limited thereto.

In its highest order, said hierarchical view comprises icons which are assigned to a traditional computer file system 9 which is named "My Computer", a seventh sub-network 15 named "Network Neighborhood", an eighth sub-network 21 which is named "My AV-Network" and a ninth sub-network 36 which is named "My Communication-Network". Said traditional computer file system 9 and said seventh to ninth sub-networks 15, 21 and 36 are all part of the home network and are all viewed in the same hierarchical manner, in conjunction with respective devices and/or services available within a respective sub-network which is further explained below. In said example each sub-network is treated as an extension of an existing file system which can be found on Personal Computers.

Further in detail, the icon assigned to "My Computer" 9 is superordinated to icons which are assigned to different drives of said computer, i. e. Floppy (A:) 10, System (C:) 11, Program (D:) 12, Data (E:) 13 and Disc (F:) 14, respectively. Further, the drive System 11 comprises directories OS 11a and Temp 11b, wherein icons assigned thereto are subordinated to the icon assigned to said drive System 11. Still further, the directory Temp 11b comprises a sub-directory Private 11c, wherein an icon assigned thereto is subordinated to the icon assigned to said directory Temp 11b.

The icon assigned to the seventh sub-network 15 is superordinated to further icons which are assigned to a PC A 17, a PC B 18, a Server A 19 and a Server B 20, which are included within said seventh sub-network 15. Further, an icon assigned to the Entire Network 16 of the seventh sub-network 15 is subordinated to the icon assigned to said seventh sub-network 15. It is to be understood that the icon assigned to the Entire Network 16 defines a purely organisational tool which is configurable by the user. This tool allows to generate a display of simply all icons assigned to any device included within the seventh sub-network 15 regardless of the respective physical connection and hierarchical order therein.

The icon assigned to the eighth sub-network 21 is superordinated to icons which are assigned to a MD-Changer 23, a CD-Changer 24, a DVD-Player 25, a DAB-Receiver 26, a DVB-Receiver 27, an AV-HD 28, a Memory Stick Drive 29, a Display 30 and a Camcorder 31, which are included within the eighth sub-network 21. Further, FIG. 1 shows that as for example, three different CD titles 24a-24c are available from different compact disks available in the CD-Changer 24. For this reason, three icons assigned to a CD-Title A (CD1) 24a, a CD-Title B (CD 2) 24b and a CD-Title C (CD 2) 24c, respectively, are subordinated to the icon which is assigned to the CD-Changer 24.

Still further, in said example two radio stations DAB Stuttgart 42 and BBC National 43 are available from said DAB receiver 26. Correspondingly, two icons assigned to DAB Stuttgart 42 and BBC National 43, respectively, are subordinated to the icon assigned to the DAB receiver 26.

Still further, in said example a plurality of radio programs is broadcast by the radio station BBC National 43, i. e. BBC World Service 43a, BBC R1 Digita 43b, BBC Xtra 43c, BBC 5Live Sport+ 43d, Heart 43e, Sunrise 43f and BBC Air Web 43g. Accordingly, icons assigned to these radio programs 43a-43g are subordinated to the icon assigned to the radio station BBC National 43. In this context, it is to be noted that said icons assigned to the radio programs 43a-43g may symbolize directories in which streams corresponding to further services may be stored.

Still further, the Camcorder 31 comprises a Camera 32, a Display 33, a Tape Recorder 34 and a Memory Stick Drive 35. Accordingly, icons assigned to the devices 32-35 are subordinated to the icon which is assigned to the Camcorder 31.

In addition, the icon assigned to the eighth sub-network 21 "My AV-Network" is superordinated to an icon assigned to the Entire AV-Network 22 which defines a purely organisational tool that can be configured by the user. As explained above for the icon assigned to the Entire Network 16, this tool allows to generate a display of simply all icons assigned to any device included within the eighth sub-network 21 "My AV-Network" regardless of either a possible subordination to an icon of a device having a higher order or a subordination to an icon assigned to a workgroup (not shown) of devices, which could be a workgroup of all Audio Devices or all Video Devices, for example.

The icon assigned to the ninth sub-network 36 is superordinated to icons which are assigned to an ISDN-Phone 38, a Mobile Phone 39, a Pager 40 and a Video Conferencing System 41, which are included within the ninth sub-network 36. Further, the icon assigned to the ninth sub-network 36 is superordinated to an icon assigned to the Entire Communication Network 37. Like the icons assigned to the Entire Network 16 and the Entire AV-Network 21, the icon assigned to the Entire Communication Network 37 defines a purely organisational tool which is configurable by the user. This tool allows to generate a display of simply all icons assigned to any device included within the ninth sub-network 36 regardless of a possible subordination to an icon of a device having a higher order with respect to the respective physical connection.

FIG. 1 further shows an additional window 8 positioned on the right hand side next to the main window 7, in which further information can be displayed for the user. This information include available components/streams and/or services, in accordance with a device and/or service displayed in the main window 7, which has been selected by the user. As for example, the radio program BBC Xtra 43c offers services like BBC Xtra Audio 44 and BBC Xtra Traffic Data 45. If the user selects said radio program BBC Xtra 43c displayed in the main window 7, in order to execute further control operations, said services BBC Xtra Audio 44 and BBC Xtra Traffic Data 45 are displayed within said additional window 8.

Alternatively, or additionally, it is possible to display further available devices and/or services via a first context sensitive menu 46, which might be displayed simultaneously with said main window 7 and said additional window 8. The context sensitive menu 46a can be activated by clicking e. g. the right mouse button. By means of said first context sensitive menu 46, as for example, the user gets access to functional services, such as Explore 46a, Open 46b, Find 46c, Copy 46d, Sharing 46e, Map Network Device 46f, Rewind 46g, Play 46h, Fast Forward 46i, Pause 46j, Stop 46k, Create Shortcut 46l, Delete 46m. Rename 46n and Properties 46o. Of course, any other service and/or device can be displayed in said first context sensitive menu 46. Still further, it is to be understood that either one context sensitive menu or a plurality of context sensitive menus can be activated with regard to a device and/or a service shown in the main window 7 and/or the additional window 8.

From the display explained above and shown in FIG. 1, it is clear that the user is supplied with a complete overview of all available sub-networks, and further of all devices connected to the distinct sub-networks and/or services corresponding to the devices. A respective number of icons is generated according to the present invention, which is representative for all sub-networks, devices and/or services included within the home network.

As to explain the function of controlling said devices and/or services included within said home network according to the invention, reference is now made to the eighth sub-network 21 "My AV-Network". As mentioned above, the radio program BBC Xtra 43c is broadcast by the radio station BBC National 43 available from the DAB Receiver 26 which is included within the eighth sub-network 21. In said example, the user selects the radio station BBC Xtra 43c so as to execute further control operations with respect thereto. As for consequence, the symbol of "BBC Xtra" 43c is highlighted, and the services corresponding thereto, i. e. BBC Xtra Audio 44 and BBC Xtra Traffic Data 45, are displayed within the additional window 8. Based on this display mode, the user is now enabled to drag e. g. BBC Xtra Audio 44 and drop it e. g. on the icon assigned to the Memory Stick Drive 29. By means of this drag and drop operation, the user can easily record the audio program of BBC Xtra 43c on the Memory Stick Drive 29. Subsequently to this operation, a data stream is generated according to the invention, which is sent from the DAB Receiver 26 to the Memory Stick Drive 29.

In the same way, the user might drop e. g. BBC Xtra Traffic Data 45 and drop it to any icon assigned to a device included within the eighth sub-network 21 which would be responsive to this kind of service. Of course, the control of said services 44 and 45 is not limited to the examples given above, and can also be executed with any suitable device included within a sub-network different from the eighth sub-network 21.

Alternatively, or additionally, controlling of said devices and/or services may also be executed via said first context sensitive menu 46. In order to explain the functioning thereof by way of example, reference is now made to the Tape Recorder 34 which is included within the Camcorder 31. If the user selects the Tape Recorder 34 shown in the main window 7 in order to execute further control operations therewith, the symbol of "Tape Recorder" 34 is highlighted. Subsequently, said first context sensitive menu 46 can be activated by clicking e. g. the right mouse button, which displays further services associated with the Tape Recorder 34. Alternatively the selection of a device and/or service and the activation of the corresponding context sensitive menu can be performed by one user action. As shown in FIG. 1, the first context sensitive menu first 46 is displayed simultaneously with said main window 7 and said additional window 8. From the listing of services corresponding to the Tape Recorder 34, which is displayed in said first context sensitive menu 46, as mentioned above, the user may choose the service Play 46h associated with the Tape Recorder 34 simply by choosing the highlighted symbol "Play". As for consequence a recording stored on said Tape Recorder 34 of said Camcorder 31 is reproduced. In general, said listing only includes services which are operatable with respect to a device that has been selected by the user.

With respect to the foregoing, it is to be understood that the control of the Tape Recorder 34 is not limited to the examples given above. Of course, any other control operation of a device and/or service would be possible within the home network via said hierarchical view of icons. Further, said first context sensitive menu 46 can also be activated with reference to a device and/or service which is not displayed in said main window 7, but rather in said additional window 8. Still further, any control operation can be executed not only by a drag/drop operation or via a context sensitive menu, but also by cut/copy and paste or other similar operations.

In general, it is obvious from the example explained in connection with FIG. 1 that numerous combinations for a communication of one device connected to a first sub-network to another device connected to the same sub-network or to a second sub-network are rendered possible. It is pointed out that during controlling of a device and/or a service corresponding thereto, the user has not to deal with generating control signals and the like. According to the invention, each of said icons is coupled with operating functions of the associated device and/or service corresponding thereto, respectively. In this context, it is to be understood that said operating functions may preferably be identical with said functional services 46a-46h as mentioned above, but they are not limited thereto. After the user has terminated the operation, a control signal and/or at least one data stream is automatically generated by the method according to the invention, which is sent from one device to at least one other device.

Further with respect to the hierarchical view as explained above and shown in FIG. 1, the eighth and ninth sub-networks 21 and 36 included within the home network may not necessarily be understood only as physical networks wherein several devices are grouped depending on their location, i.e. a specific room in a house or a connection within a home network, and are served e.g. by the same physical bus. Alternatively, the eighth and ninth sub-networks 21 and 36 can also be considered as logical networks in which various devices are grouped together in accordance with their category, not depending on their respective location within the home and/or the home network, respectively.

Figure 2:
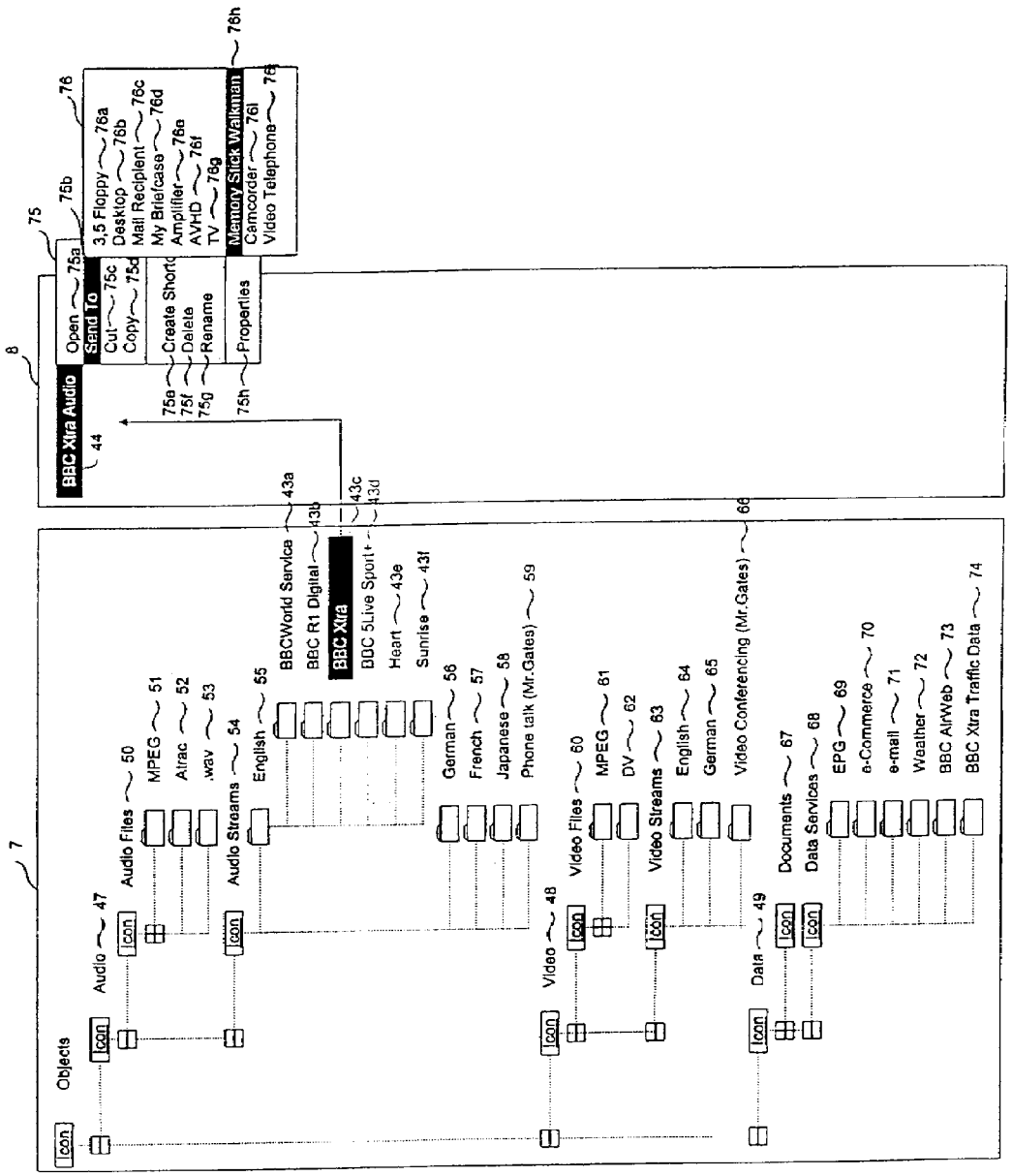
FIG. 2 illustrates an example of a browser based MMI according to the present invention wherein a hierarchical view of icons generated according to the present invention is organized depending on the kind of services being available corresponding to said devices.

FIG. 2 illustrates an example of a browser-based MMI according to the present invention wherein a hierarchical view of icons generated according to the present invention is organized depending on the kind of services being available in correspondence with said corresponding devices. The view of icons shown in FIG. 2 basically provides the same information as the view of icons shown in FIG. 1, but the structure thereof is organized in a different way compared to the view of icons shown in FIG. 1.

FIG. 2 shows the main window 7 and the additional window 8, in which icons assigned to various services are displayed. Within the main window 7, in its highest order, said hierarchical view comprises icons which are assigned to services such as Audio 47, Video 48 and Data 49. Said services 47-49 are all available within the home network and are all viewed in the same hierarchical manner, in conjunction with further services related thereto.

In detail, service Audio Files 50 and Audio Streams 54 are subordinated to the service Audio 47. As for consequence, the icon assigned to Audio 47 is superordinated to icons assigned to Audio Files 50 and Audio Streams 54, respectively. In conjunction with the service Audio Files 50, different directories are provided in which files having an extension such as MPEG 51, Atrac 52 and .wav 53 can be stored, respectively. In accordance therewith, the icon assigned to the service Audio Files 50 is superordinated to icons assigned to MPEG 51, Atrac 52 and .wav 53.

The service Audio Streams 54 is superordinated to streams based on different languages such as English, German, French, Japanese. The service Audio Streams 54 is also superordinated to a stream including information of a Phone talk which has been conducted e. g. to Mr. Gates. According thereto the icon assigned to Audio Streams 54 is superordinated to various directories which are assigned to the streams of the different languages. As for consequence, icons assigned to English 55, German 56, French 57, Japanese 58 and Phone Talk (Mr. Gates) 59, respectively, are subordinated to the icon assigned to Audio Streams 54. Further, the English streams 55 include different radio programs, such as BBC Worldwide Service 43a, BBC R1 Digital 43b, BBC Xtra 43c, BBC 5Live Sport+ 43d, Heart 21e and Sunrise 43f. Correspondingly, icons assigned to said radio programs 43a-43f are related to the icon assigned to English 55, wherein said icons may symbolize directories, respectively.

With reference to the service Video 48, video files and video streams are subordinated. Correspondingly, the icon assigned to Video 48 is superordinated to icons which are assigned to services Video Files 60 and Video Streams 63. According to different types of files which are available as video files, i. e. MPEG 61 and DV 62, different directories are subordinated to Video Files 60. According thereto, icons assigned to MPEG 61 and DV 62 are subordinated to the icon assigned to Video Files 60. Further, video streams are available in English and German. In addition, a video stream is available including data about video conferencing, e. g. with Mr. Gates. Accordingly, icons assigned to English 64, German 65 and Video Conferencing (Mr. Gates) 66, respectively, are subordinated to the icon which is assigned to Video Streams 63.

Said hierarchical view further provides information about data which is available e. g. in documents or via data services. Accordingly, the icon assigned to Data 49 is superordinated to icons which are assigned to Documents 67 and Data Services 68, respectively. It is to be understood that said icons assigned to Documents 67 and Data Services 68, respectively, may symbolize directories. Still further, data is available from different data services, such as EPG, e-Commerce, e-Mail, Weather, the radio program BBC Air Web and the radio program service BBC Xtra Traffic Data. In correspondence thereto, the icon assigned to Data services 68 is superordinated to icons assigned to EPG 69, e-Commerce 70, e-Mail

71, Weather 72, BBC Air Web 73 and BBC Xtra Traffic Data 74, respectively, which may symbolize directories in which further files can be stored.

The additional window 8 displays further information for the user. This information includes available components/streams and/or services, in accordance with a device and/or service displayed in the main window 7. In said example, based on the selection of the radio program BBC Xtra 43c of the category English Audio Streams 55, the additional window 8 displays the radio program service BBC Xtra Audio 44. In correspondence with said service BBC Xtra Audio 44, a second context sensitive menu 75 is displayed simultaneously with said main window 7 and said additional window 8, wherein processing services are indicated, such as Open 75a, Send To 75b, Cut 75c, Copy 75d, Create Shortcut 75e, Delete 75f, Rename 75g and Properties 75h. Of course, any other service could be displayed in said second context sensitive menu 75.

Corresponding to the selection of the processing service Send To 75b, a third context sensitive menu 76 is displayed on the right hand side next to said second context sensitive menu 75. Within the third context sensitive menu 76, a selection of devices included within the home network is displayed, such as 3,5 Floppy 76a, Desktop 76b, Mail Recipient 76c, My Briefcase 76d, Amplifier 76e, AVHD 76f, TV 76g, Memory Stick Walkman 76h, Camcorder 76i and Video Telephone 76j. Alternatively any other context sensitive menu, or a plurality of context sensitive menus, can also be activated corresponding to a service which is displayed in said main window 7 and/or in said additional window 8. In this context, with reference to the kind of hierarchical view shown in FIG. 2, it is generally to be understood that only such functional services and devices are displayed in said context sensitive menus, which may be operatable in conjunction with each other.

In the following, reference is made to the radio program BBC Xtra 43c in order to explain the control of the services shown in said hierarchical view of FIG. 2. In case that the user selects BBC Xtra 43c in order to execute a control operation therewith the symbol of "BBC Xtra" 43c is highlighted and subsequently the audio stream BBC Xtra Audio 44 which is provided by the radio program BBC Xtra 43c is displayed in the additional window 8, as described above. In order to get access to processing services associated with BBC Xtra Audio 44 the user can activate said second context sensitive menu 75 by clicking e. g. the right mouse button. Among the selection of services displayed in said second context sensitive menu 75 the user can choose the service Send To 75b e. g. by mouse clicking or keyboard control. Subsequently to this operation the third context sensitive menu 76 is activated in which a selection of devices corresponding to said services displayed, as discussed above. Based on said selection of devices the user is now enabled to select e. g. the Memory Stick Walkman 76h from this common MMI in order to send data of said radio program service BBC Xtra Audio 44 to the Memory Stick Walkman 76h. Subsequently to this operation a data stream is generated according to the invention which is sent from the DAB Receiver supplying the radio program service BBC Xtra Audio 44 to the Memory Stick Walkman 76h in order to perform said recording.

With respect to said hierarchical view shown in FIG. 2 it is to be understood that any other control can be executed with respect to any other service and/or device included within the home network. Also, said control can not only be executed via a context sensitive menu, as in the example discussed above, but also by a drag and drop operation and/or by cut/copy and paste or other similar operations.

By way of said example wherein data of BBC Xtra Audio 35 is sent to a Memory Stick Drive, it is clear that the same kind of data transmission can be executed either via the hierarchical view organized depending on the kind of devices and/or sub-networks shown in FIG. 1, or via the hierarchical view organized depending on the kind of services shown In FIG. 2.

In the following, examples for control operations executed within said home network are explained with reference to FIGS. 3 to 5. In this context, the respective steps of data exchange between respective devices included within said home network will also be explained.

Figure 3A:
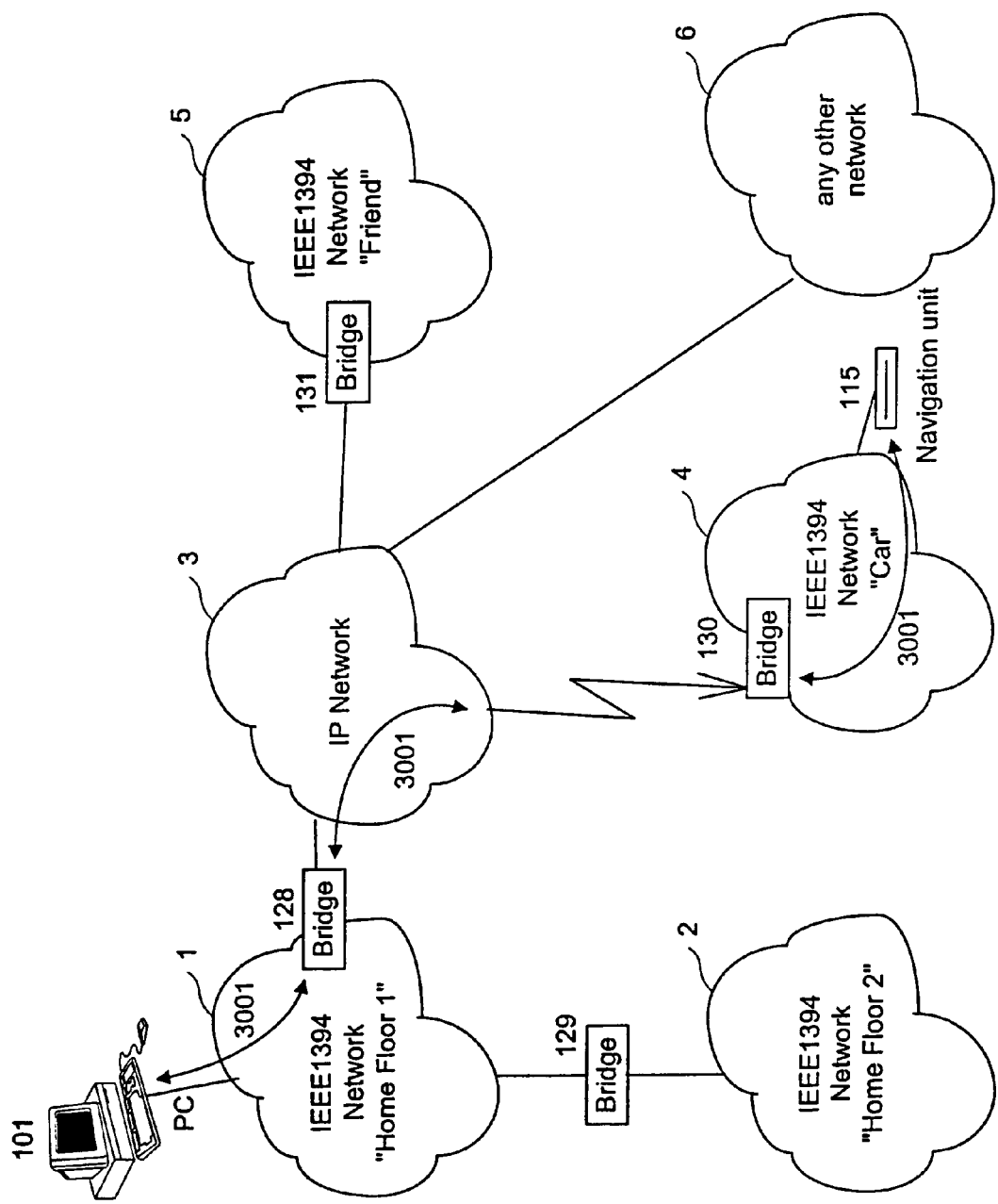
FIGS. 3a, 3b illustrate an example of a network communication according to the present invention wherein a file transfer from a PC to a navigation unit is executed.
Figure 3B:
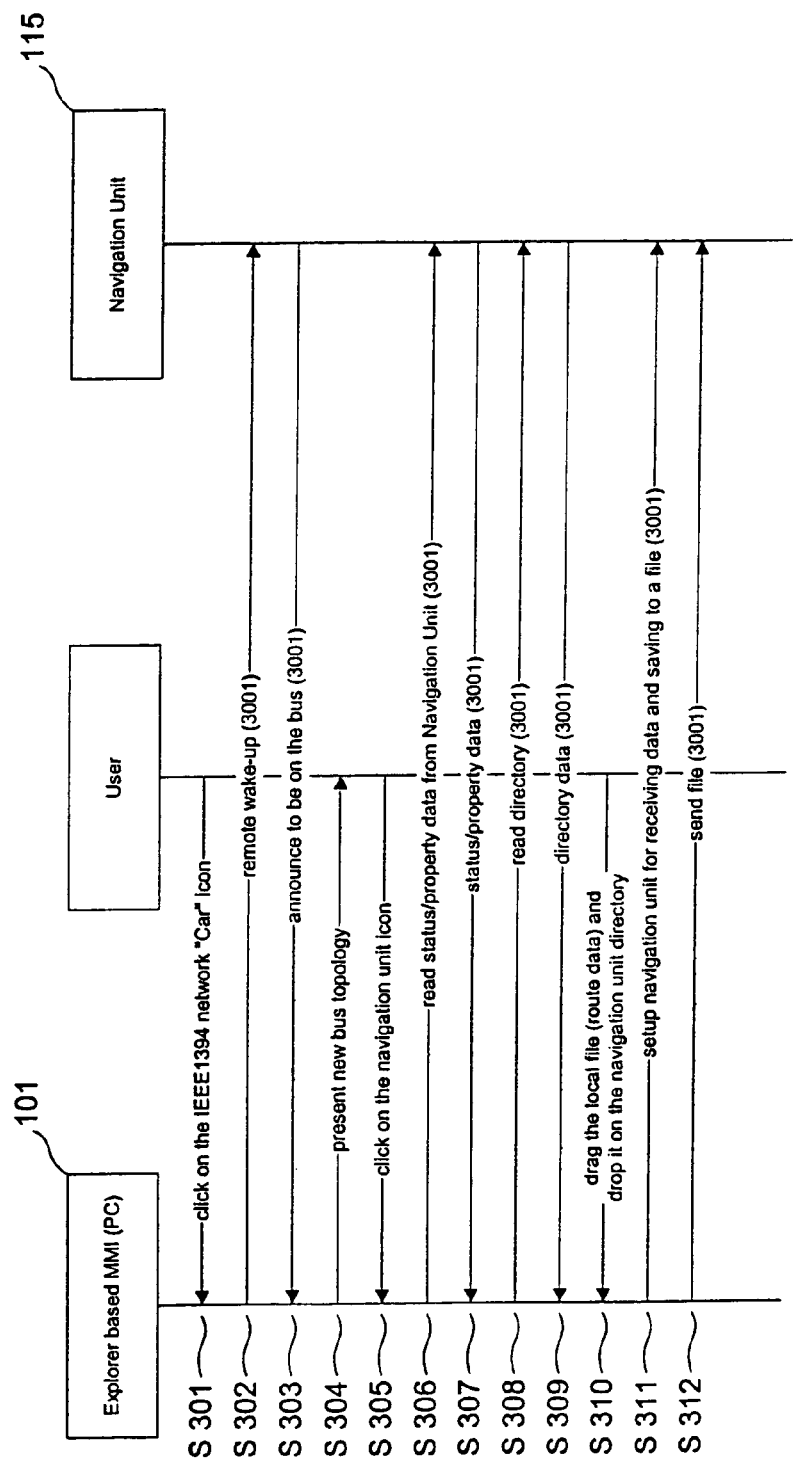
Figure 4A:
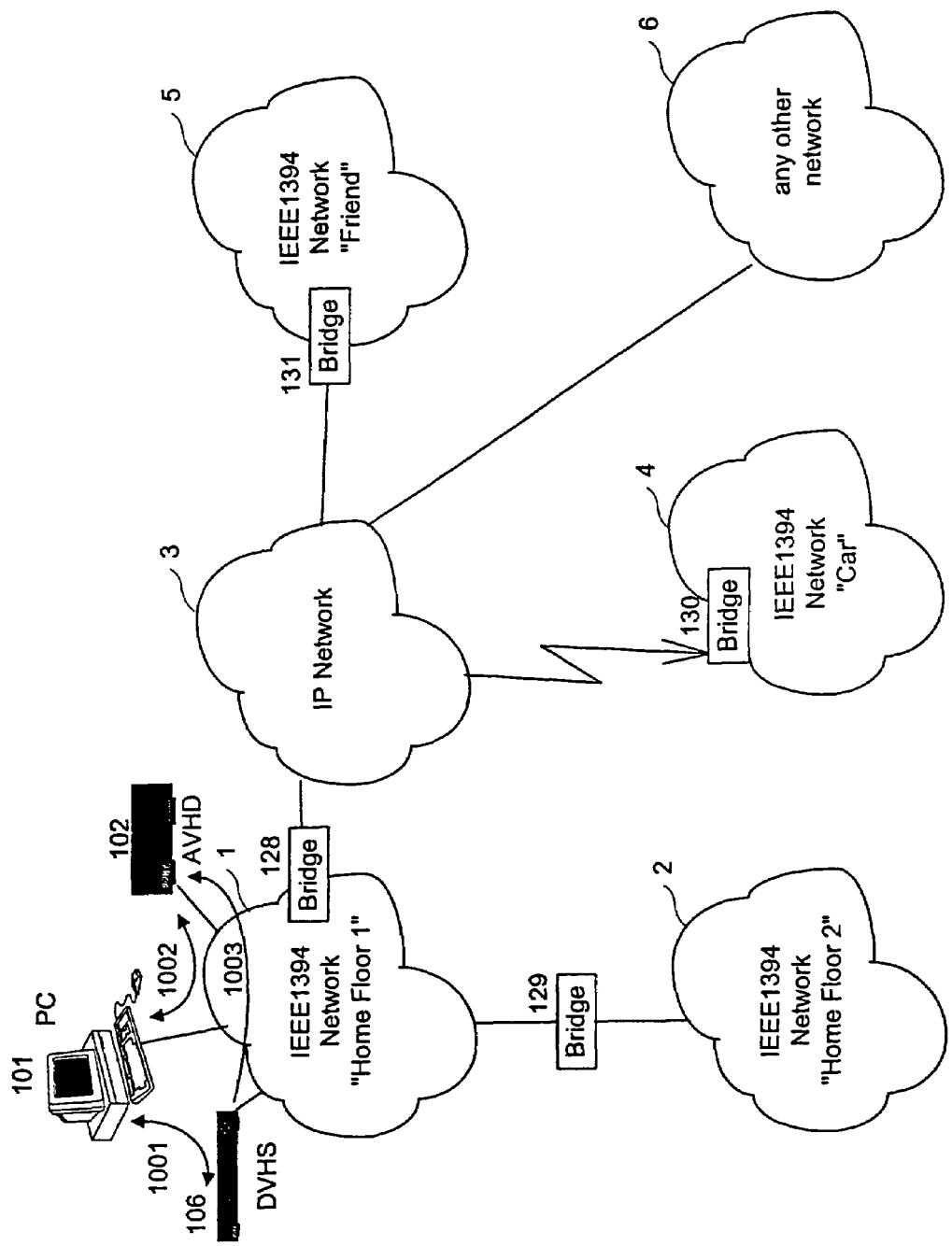
Figure 5A:
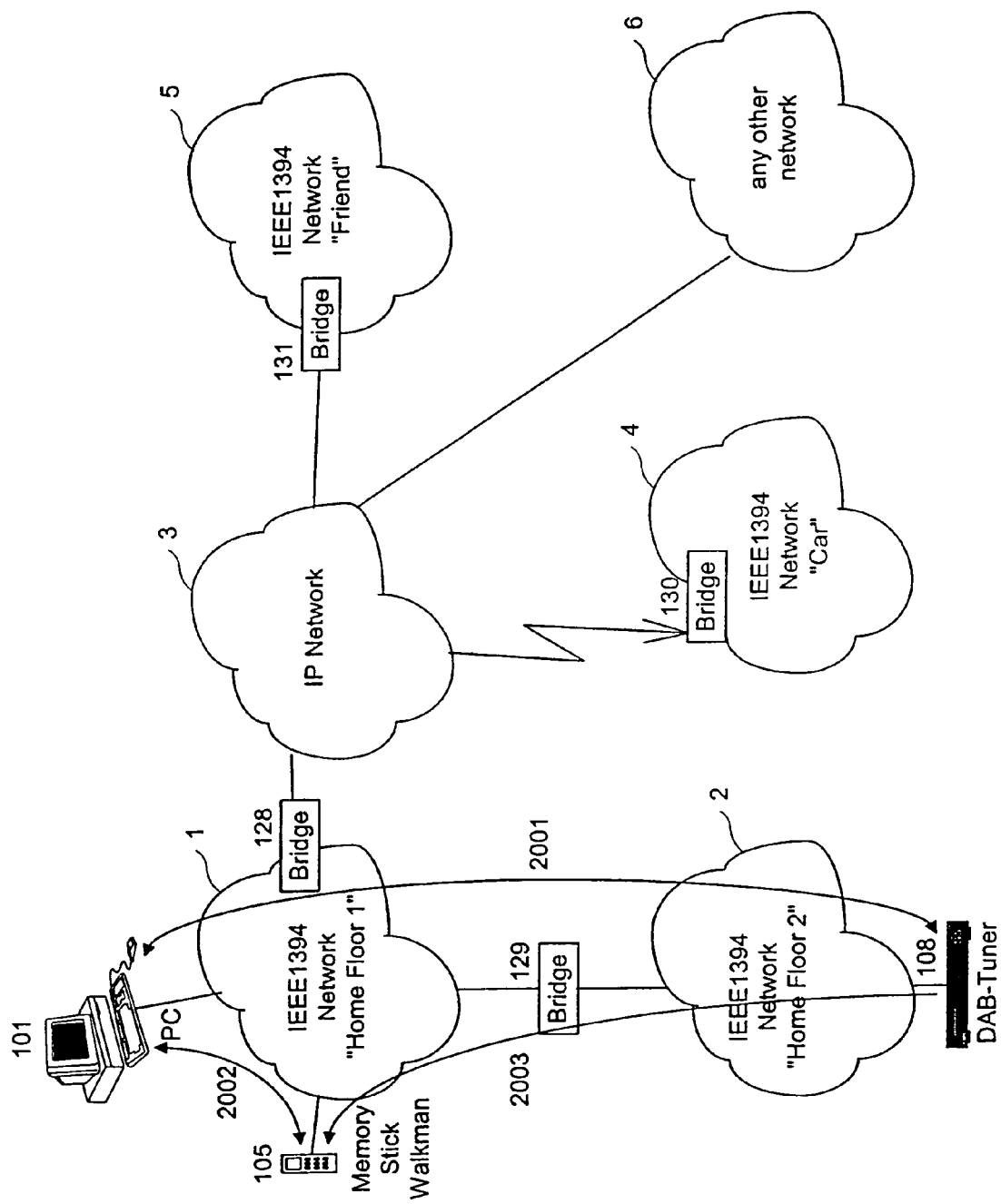
FIGS. 5a, 5b illustrate still another example of a network communication according to the present invention wherein a DAB audio stream from a DAB tuner is copied to a memory stick walkman via a control by a PC.
Figure 5B:
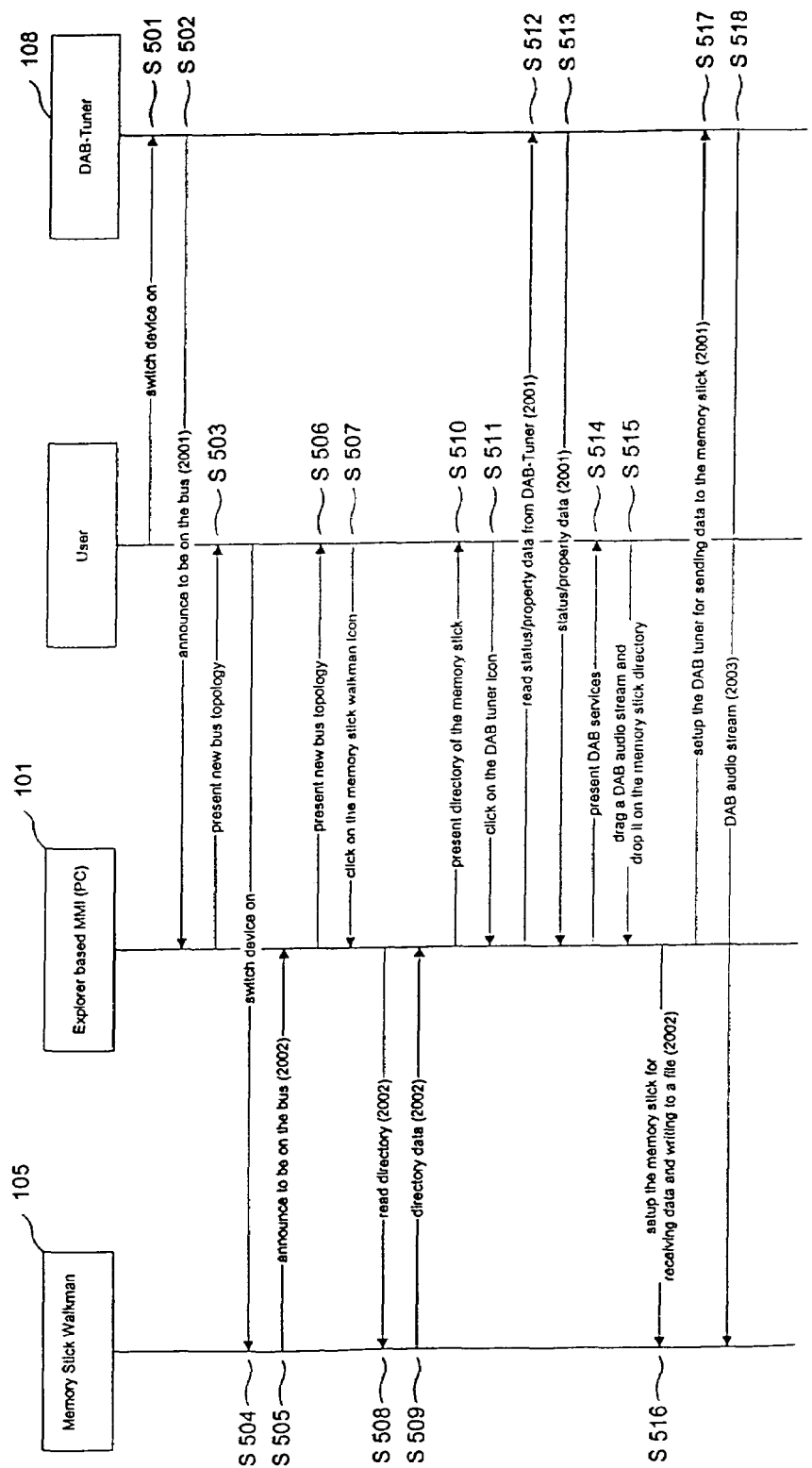
Figure 6:
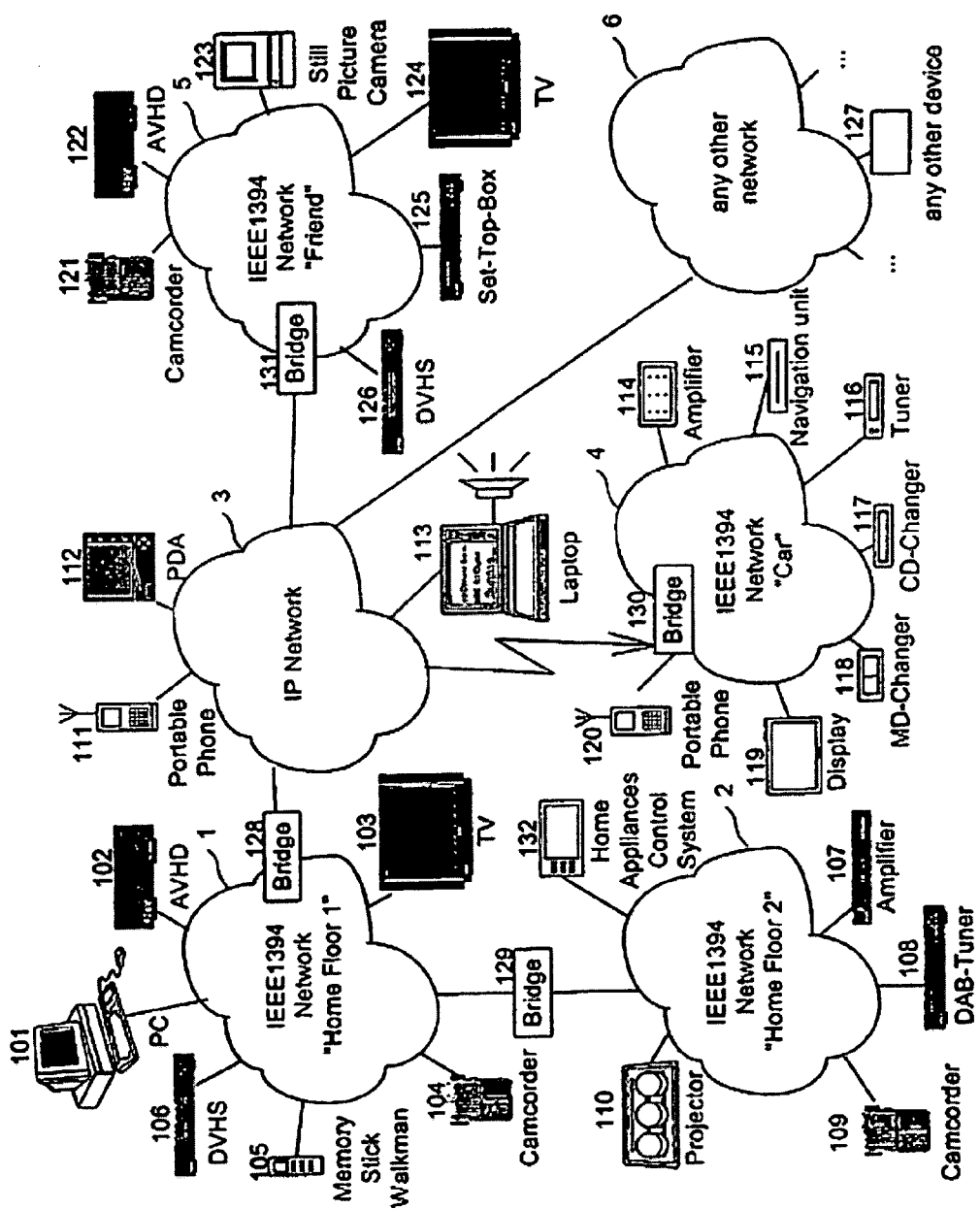
FIG. 6 shows a configuration of a prior art network including various kinds of devices and several sub-networks.

In general, FIGS. 3a, 4a and 5a illustrate an example of a network communication, respectively, which is basically constituted of the same devices and sub-net-works connected via the same bridges as shown in FIG. 6, respectively. The same devices and sub-networks are designated with the same reference signs and named with the same expression, respectively, wherein a detailed explanation thereof is omitted. Contrary to FIG. 6, the FIGS. 3a-5a only show devices which are relevant for the respective control operations. For reasons of simplicity, all other devices included within the home network are not shown in FIGS. 3a-5a, since they are not relevant.

FIGS. 3a and 3b illustrate an example of a network communication, wherein a file transfer from a PC to a navigation unit is executed. Contrary to FIG. 6, FIG. 3a only shows the devices which are relevant for the explained file transfer, i. e. the PC 101 which is connected to the first sub-network 1, and further the Navigation Unit 115 which is connected to the fourth sub-network 4. Further, FIG. 3a shows a plurality of arrows 3001, wherein an arrow 3001 is arranged between the PC 101 and the first bridge 128, further between the first bridge 128 and the third bridge 130 extending through the symbol of the third sub-network 3, and finally between the third bridge 130 and the Navigation Unit 115, respectively. The plurality of arrows 3001 defines a bidirectional data connection between the PC 101 and the Navigation Unit 115 which is used to control the Navigation Unit 115 and to send streams, and which is realized via the first sub-network 1, the first bridge 128, the third sub-network 3, the third remote bridge 130 and finally the fourth sub-network 4. In the following, such a data connection is only referred to "first data connection 3001".

FIG. 3b, the respective steps required for said file transfer shown in FIG. 3a are explained. At first, in step S 301, the user selects the icon assigned to the fourth sub-network 4, by which an output signal to the PC 101 is generated. The PC 101 is provided with an explorer-based MMI, as shown for example in FIGS. 1 and 2, respectively. Thereafter, in step S 302, the PC 101 outputs a remote wake-up signal to the Navigation Unit 115 via said first data connection 3001.

As a response to receiving the remote wake-up signal from the PC 101, in step S 303, the Navigation Unit 115 outputs a signal back to the PC 101 in order to announce being on the bus, also using said first data connection 3001. In this step, also other devices connected to the fourth sub-network 4 "Car" might announce to be on the bus. Then, in step S 304, the display of the MMI indicates the new bus topology to the user, i.e. all devices and/or services being directly subordinated to "Car". Subsequently in step S 305, the user selects the newly shown icon assigned to the Navigation Unit 115, which generates a corresponding signal within the PC 101. As for consequence, in step S 306, the PC 101 reads the status/property data from the Navigation Unit 115 via said first data connection 3001. Following this action, in step S 307, respective signals representing the status/property data of the Navigation Unit 115 are sent back to the PC 101 via said first data connection 3001. In general, these signals provide information which is used internally e.g. in the PC or any other controller as a part of an appropriate control protocol in order to determine type and capabilities of a device when included within the home network.

Subsequently, in step S 308, the PC 101 reads the directory from the Navigation Unit 115 via said first data connection 3001, whereinafter in step S 309, the directory data are sent from the Navigation Unit 115 to the PC 101 via said first data connection 3001 and displayed within the MMI. By displaying said directory to the user, the user is allowed e. g. to view the map data which are already installed or available on the Navigation Unit 115. However, this step may not be necessary for all types of navigation systems depending on the upgrade version of the system.

Subsequently, in step S 310, the user drags a local file, e.g. route data, and drops it on the icon assigned to a directory of the Navigation Unit 115, which is displayed on the MMI provided within the PC 101. As for result, in step S 311, the PC 101 executes a set-up for the Navigation Unit 115 via first said data connection 3001 for receiving data and saving to a file. In the last step S 312, the PC 101 sends a file to the Navigation Unit 115 via said first data connection 3001, wherein said file transfer from the PC 101 to the Navigation Unit 115 is accomplished.

FIGS. 4*a* and 4*b* illustrate another example of a network communication, wherein the user decides to copy a DV stream from DVHS 106 to AVHD 102. This network communication is executed preferably on the basis of a hierarchical view of icons depending on the kind of devices and/or sub-networks, as shown in FIG. 1, but is not limited thereto.

In addition to the first to sixth sub-networks 1-6 and with respect to devices included within the home network, FIG. 4*a* only shows the PC 101, the AVHD 102 and the DVHS 106, which are all connected to the first sub-network 1. Further, an arrow 1001 is shown which is arranged between the PC 101 and the DVHS 106. This arrow 1001 defines a bidirectional asynchronous data connection between the PC 101 and the DVHS 106 which is used to control the DVHS 106 and is realized via the first sub-network 1. In the following, such data connection is only referred to "first control connection 1001".

Further, FIG. 4*a* shows an arrow 1002 which is arranged between the PC 101 and the AVHD 102. This arrow defines a bidirectional asynchronous data connection between the PC 101 and the AVHD 102 which is used to control the AVHD 102 and is realized via the first sub-network 1. In the following, for such a data connection reference is only made to "second control connection 1002".

Still further, there is shown an arrow 1003 arranged between the DVHS 106 and the AVHD 102 which defines a unidirectional isochronous data connection. Data streams can be transferred via this type of data connection. In the following, reference is only made to "first transfer connection 1003" for such a data connection between the DVHD 106 and the AVHD 102 which is realized via the first sub-network 1. It is to be noticed that said first transfer connection 1003 is logically different from said first and second control connections 1001 and 1002. The first and second control connections 1001 and 1002 are bidirectional asynchronous transient connections which are used to negotiate or set up the unidirectional isochronous first transfer connection 1003.

With reference to FIG. 4*b*, the respective steps will be explained which are necessary for copying said DV stream from the DVHS 106 to the AVHD 102. Initially, in step S 401, the user switches on the DVHS 106. Subsequently, in step S 402, the DVHS 106 announces to the PC 101 via said first control connection 1001 to be on the bus. An explorer based MMI, as it is illustrated in FIGS. 1 and 2, for example, is provided within the PC 101 and presents the new bus topology including the DVHS 106 to the user in step S 403. Subsequently, the user switches on the AVHD 102 in step S 404, whereinafter in step S 405, the AVHD 102 announces to the PC 101 via the second control connection 1002 to be on the bus. In the following, in step S 406, this change of the bus topology is indicated to the user via the MMI.

After both devices DVHS 106 and AVHD 102 are in an operating mode, the user selects the icon assigned to the AVHD 102 in step S 407. Subsequently, in step S 408, the PC 101 reads the directory of the AVHD 102 via said second control connection 1002. In return, in step S 409, information representing the directory data AVHD 102 is sent back to the PC 101 via said second control connection 1002. Thereafter, the present directory of the AVHD 102 is displayed to the user via the MMI according to the present invention in step S 410. In the next step S 411, the user selects on the icon assigned to the DVHS 106, which makes the PC 101 read a status/property data from the DVHS 106 via said first control connection 1001 in step 412. In return, in step S 413, a data stream representing the status/property data of the DVHS 106 is sent to the PC 101 again via said first control connection 1001. After the PC 101 has received the respective information, in step S 414, the present stream of the DVHS 106 is displayed to the user via the MMI.

After the necessary information of the DVHS 106 and the AVHD 102 is displayed via the MMI, in step S 415, the user subsequently drags the DVHS video stream and drops it on the icon assigned to a directory of the AVHD 102, preferably based on the hierarchical view as illustrated in FIG. 1. After this operation, in step S 416, the PC 101 sends a signal via the second control connection 1002 in order to set up the AVHD 102 for receiving a DV stream and writing to a file. In step 417, the PC 101 also sends a signal via the first control connection 1001 to the DVHS 106 in order to set up this device for sending data to the AVHD 102. Finally, in step S 418, said DV stream is copied from the DVHS 106 to the AVHD 102 via the first transfer connection 1003 wherein the copying of said DV stream is accomplished.

FIGS. 5*a* and 5*b* illustrate a further example of a network communication, wherein the user decides to copy a DAB audio stream from DAB-Tuner 108 to Memory Stick Walkman 105. This network communication is executed preferably on the basis of a hierarchical view of icons depending on the kind of services, as shown in FIG. 2, but is not limited thereto. Correspondingly, in addition to the first to sixth sub-networks 1-6 FIG. 5*a* only shows the PC 101 and the Memory Stick Walkman 105 which are connected to the first sub-network 1, and the DAB-Tuner 108 which is connected to the second sub-network 2.

FIG. 5*a* further shows an arrow 2001 which is arranged between the PC 101 and the DAB-Tuner 108. This arrow 2001 defines a bidirectional data connection between the PC 101 and the DAB-Tuner 108 which is used to control the DAB-Tuner 108 and is realized via the first sub-network 1, the second bridge 129 and the second sub-network 2. This data connection is of a asynchronous transient connection type. In the following, for such a data connection reference is only made to "third control connection 2001".

Further, FIG. 5*a* shows an arrow 2002 which is arranged between the Memory Stick Walkman 105 and the PC 101. This arrow 2002 defines a bidirectional data connection between the Memory Stick Walkman 105 and the PC 101 which is used to control the Memory Stick Walkman 105 and is realized via the first sub-network 1. In the following, for such a data connection reference is only made to "fourth control connection 2002". Like the third control connection 2001, the fourth control connection 2002 is also of a asynchronous transient connection type.

Still further, FIG. 5a shows an arrow 2003 which is arranged between the DAB-Tuner 108 and the Memory Stick Walkman 105. Said arrow 2003 defines a unidirectional isochronous data connection between the DAB-Tuner 108 and the Memory Stick Walkman 105, which is realized via the first sub-network 1, the second bridge 129 and the second sub-network 2. Data streams can be transferred by this data connection. In the following, such data connection is only referred to "third transfer connection 2003". It is to be noted that the third data connection is logically different from the third and fourth control connections 2001 and 2002 which are used to negotiate or to set up the third transfer connection 2003 as will be explained further below.

In the following, the necessary steps for copying the DAB audio stream from the DAB-Tuner 108 to the Memory Stick Walkman 105 are explained with reference to FIG. 5b. In a first step S 501, the user switches on the DAB-Tuner 108. In return, in step S 502, the DAB-Tuner 108 announces to the PC 101 via the third control connection 2001 to be on the bus, whereinafter the MMI implemented in the PC 101 displays the present new bus topology to the user in step S 503. In step S 504, the user switches on the Memory Stick Walkman 105, wherein in step S 505, the Memory Stick Walkman 105 announces to the PC 101 to be on the bus via the fourth control connection 2002. After this change of the bus topology, in step S 506, the MMI displays the present new bus topology to the user.

As soon as the user has taken said preparatory steps, in step S 507, he selects the icon assigned to the Memory Stick Walkman 105, which makes the PC 101 sending a control signal in step S 508 via the fourth connection 2002 in order to read the directory of the Memory Stick Walkman 105. In return, in step S 509, respective information of the directory data of the Memory Stick Walkman 105 is sent back to the PC 101 via the fourth control connection 2002. Subsequently, in step S 510, the present directory of the Memory Stick Walkman 105 is displayed to the user via the MMI.

In step S 511, the user selects the icon assigned to the DAB-Tuner 108 which is displayed on the MMI, in order to make the PC 101 to send a control signal in step S 512 to the DAB-Tuner 108 via the third control connection 2001 in order to read its status/property data. As for result, respective information of the status/property data of the DAB-Tuner 108 are sent back to the PC 101 via the third control connection 2001 in step S 513, which makes the MMI to display the present available DAB services to the user in step S 514.

Subsequently in step S 515, the user drags a DAB audio stream and drops it on an icon assigned to a directory of the Memory Stick Walkman 105. Following this operation, in step S 516, the PC 101 sends a control signal to the Memory Stick Walkman 105 via the fourth control connection 2002, in order to setup the Memory Stick Walkman 105 for receiving data and writing to a file. In step S 517, the PC 101 sends a control signal to the DAB-Tuner 108 via the third control connection 2001, in order to setup the DAB-Tuner 108 for sending data to the Memory Stick Walkman 105. Finally, as for result, the DAB-Tuner 108 copies said DAB audio stream to the Memory Stick Walkman 105 via the third transfer connection 2003, wherein the copying of said data stream is accomplished.

With respect to the examples of transferring a data stream explained above with reference to FIGS. 4 and 5, it is to be understood that it might be further possible to monitor the status of said stream transfer via the MMI of the PC 101. In such a case the necessary data information would be transferred to the PC 101 through an unidirectional isochronous data connection between the respective device, e.g. the DVHS 106 or the DAB-Tuner 108, respectively, and the PC 101.

Of course, the possibility of monitoring the status of a stream transfer via the MMI of a PC included within the home network is not limited to the examples explained with reference to FIGS. 4 and 5. Said monitoring might also be executed during a data stream transfer between any other devices included within the home network wherein an appropriate unidirectional isochronous data connection is provided between a respective device and the PC included within the home network in order to transfer the necessary data information to the PC through said data connection.

It is to be understood that the invention is not limited to the examples explained with reference to the FIGS. 1 to 5. Of course, any other operation between devices and/or services included within said home network may also be executed according to the present invention.

The invention claimed is:

1. A method for controlling network devices via a home network, the network devices being connected to said home network via different protocol standards, comprising:

displaying generated icons of the network devices having a plurality of functions regarding a reproducing and/or recording of an audio/video signal, icons of a plurality of services provided by each device grouped according to the type of services provided, and menus including the functions which are operable with the associated network device or service;

at least partially displaying the generated icons with a hierarchical structure so as to show a relationship of network connections of the network devices in the home network;

receiving a selection of a network device or a service by a user selecting one of the displayed icons;

selectively displaying the menu of a selected network device or service, the menu including the functions which are operable with the selected network device or service;

receiving a selection of a function in the selectively displayed menu; and controlling the network device or service to execute the selected function based on a respective one of the protocol standards, wherein the execution of the selected function results in a data stream of an audio/video signal stored in a providing network device being sent from the providing network device to the selected network device or to a device capable of receiving said data stream via the home network.

2. The method according to claim 1, wherein said network devices include all compatible devices that are connected to the home network.

3. The method according to claim 1, wherein said home network, further includes one or more sub-networks integrated into said home network via a bridge.

4. The method according to claim 3, wherein at least partially displaying the icons with a hierarchical structure further includes organizing the icons according to the kind of sub-networks connected to said network.

5. The method according to claim 1, wherein the selected function in the displayed menu is a "send to" function.

6. The method according to claim 1, further comprising selecting a providing network device.

7. The method according to claim 6, further comprising selecting an audio/video signal stored on the selected providing network device.

8. A controller including a man-machine interface for controlling network devices vi a home network, the network devices being connected to said home network via different protocol standards, comprising:
- means for displaying generated icons of the network devices having a plurality of functions regarding a reproducing and/or recording of an audio/video signal, icons of a plurality of services provided by each device according to the type of services provided, and menus including the functions which are operable with the associated network device;
- means for at least partially displaying the generated icons with a hierarchical structure so as to show a relationship of network connections of the network devices in the home network;
- means for receiving a selection of a network device or service by a user selecting one of the displayed icons;
- means for selectively displaying the menu of a selected network device or service, the menu including the functions which are operable with the selected network device or service;
- means for receiving a selection of a function in the selectively displayed menu; and
- means for controlling the network device or service to execute the selected function based on a respective one of the protocol standards,
- wherein the execution of the selected function results in a data stream of an audio/video signal stored in a providing network device being sent from the providing network device to the selected network device or to a device capable of receiving said data stream via the home network.

9. The controller according to claim 8, wherein said network devices include all compatible devices that are connected to the home network.

10. The controller according to claim 8, wherein said home network, further includes one or more sub-networks integrated into said home network via a bridge.

11. The controller according to claim 10, wherein means for at least partially displaying the icons with a hierarchical structure further includes means for organizing the icons according to the kind of sub-networks connected to said network.

12. The controller according to claim 8, wherein the selected function in the displayed menu is a "send to" function.

13. The controller according to claim 8, further comprising means for selecting a providing network device.

14. The controller according to claim 13, further comprising means for selecting an audio/video signal stored on the selected providing network device.

15. A computer readable storage medium having computer readable program code stored thereon for causing a computer to provide a man-machine interface for controlling network devices via a home network, the network devices being connected to said home network via different protocol standards, the computer readable medium comprising executable instructions that cause a computer to:
- displaying generated icons of the network devices having a plurality of functions regarding a reproducing and/or recording of an audio/video signal, icons of a plurality of services provided by each device according to the type of services provided, and menus including the functions which are operable with the associated network device or service;
- at least partially display the generated icons with a hierarchical structure so as to show a relationship of network connections of the network devices in the home network;
- receive a selection of a network device or service by a user selecting one of the displayed icons;
- selectively display the menu of a selected network device or service, the menu including the functions which are operable with the selected network device or service;
- receive a selection of a function in the selectively displayed menu; and
- control the network device or service to execute the selected function based on a respective one of the protocol standards,
- wherein the execution of the selected function results in a data stream of an audio/video signal stored in a providing network device being sent from the providing network device to the selected network device or to a device capable of receiving said data stream via the home network.

* * * * *

UNITED STATES PATENT AND TRADEMARK OFFICE
CERTIFICATE OF CORRECTION

PATENT NO. : 7,565,626 B2 Page 1 of 3
APPLICATION NO. : 09/901275
DATED : July 21, 2009
INVENTOR(S) : Arnd Krusche et al.

It is certified that error appears in the above-identified patent and that said Letters Patent is hereby corrected as shown below:

Cover page, item (73) Assignee, change "Sony Deutschalnd GmbH, Cologne (DE)" to
--Sony Deutschland GmbH, Cologne (DE)--;

Cover page, item (30), change "(DE)" to --(EPO)--; and change "00114792" to
--00114792.5--;

Cover page, below Abstract paragraph, change "15 Claims, 9 Drawing Sheets" to
--22 Claims, 9 Drawing Sheets--;

Column 16, Claim 1, line 26, insert --simultaneously-- in front of the word "displaying";
line 53, delete "." and insert --; and--;
line 54, insert --receiving a user selection resulting from a dragging
of one of the displayed icons of the plurality of services provided by
a corresponding network device and a dropping of the icon on an
icon of another network device to perform the service corresponding
to the dragged and dropped icon on the another network device.--;

Column 17, Claim 8, line 5, delete "vi" and insert --via--;
line 8, insert --simultaneously-- in front of the word "displaying";
line 12, insert --grouped-- in front of the word "according";
line 35, delete "." and insert --; and--;
line 36, insert --means for receiving a user selection resulting from a
dragging of one of the displayed icons of the plurality of services
provided by a corresponding network device and a dropping of the
icon on an icon of another network device to perform the service
corresponding to the dragged and dropped icon on the another
network device.--;

Column 18, Claim 15, line 14, insert --storage-- in front of the word "medium";
line 16, insert --simultaneously-- in front of the word "displaying";
line 44, delete "." and insert --; and--;

Signed and Sealed this

Fifteenth Day of June, 2010

David J. Kappos
*Director of the United States Patent and Trademark Office* line 45, insert --receive a user selection resulting from a dragging of one of the displayed icons of the plurality of services provided by a corresponding network device and a dropping of the icon on an icon of another network device to perform the service corresponding to the dragged and dropped icon on the another network device.--;

After Claim 15, please add Claims 16-22 that were omitted from the Letters Patent:

--Claim 16 A method for providing a man-machine interface for controlling network devices via a home network, the network devices being connected to said home network via different protocol standards, comprising:
simultaneously displaying generated icons of the network devices having a plurality of functions regarding a reproducing and/or recording of an audio/video signal, icons of a plurality of services provided by each device grouped according to the type of services provided, and menus including the functions which are operable with/by the associated network device/service;
at least partially displaying the generated icons with a hierarchical structure so as to show a relationship of network connections of the network devices in the home network;
receiving a selection of a network device or service by a user selecting one of the displayed icons;
selectively displaying the menu of a selected network device or service, the menu including the functions which are operable with the selected network device/service;
receiving a selection of a function in the selectively displayed menu;
controlling the network device or service to execute the selected function based on a respective one of the protocol standards, wherein the execution of the selected function results in a data stream of an audio/video signal stored in a providing network device being sent from the providing network device to the selected network device or to a device capable of receiving said data stream via the home network; and
receiving a user selection resulting from a dragging of one of the displayed icons of the plurality of services provided by corresponding network device and a dropping of the icon on an icon of another network device to perform the service corresponding to the dragged and dropped icon on the another network device.--;

--Claim 17 The method according to claim 16, wherein said network devices include all compatible devices that are connected to the home network.--;

--Claim 18 The method according to claim 16, wherein said home network, further includes one or more sub-networks integrated into said home network via a bridge.--;

--Claim 19 The method according to claim 18, wherein at least partially displaying the icons with a hierarchical structure further includes organizing the icons according to the kind of sub-networks connected to said network.--;

--Claim 20 The method according to claim 16, wherein the selected function in the displayed menu is a "send to" function.--;

--Claim 21 The method according to claim 16, further comprising selecting a providing network device.--;

--Claim 22 The method according to claim 21, further comprising selecting an audio/video signal stored on the selected providing network device.--.